US012798408B2

(12) United States Patent
Hashimoto et al.

(10) Patent No.: US 12,798,408 B2
(45) Date of Patent: Nov. 17, 2026

(54) CONTROL DEVICE FOR POWER SUPPLY DURING TRAVELING

(71) Applicant: TOYOTA JIDOSHA KABUSHIKI KAISHA, Toyota (JP)

(72) Inventors: Toshiya Hashimoto, Miyoshi (JP); Masato Maemura, Nisshin (JP); Shogo Tsuge, Fuji (JP); Ryosuke Ikemura, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 520 days.

(21) Appl. No.: 18/536,555

(22) Filed: Dec. 12, 2023

(65) Prior Publication Data

US 2024/0253483 A1 Aug. 1, 2024

(30) Foreign Application Priority Data

Feb. 1, 2023 (JP) ................................ 2023-013870

(51) Int. Cl.
*B60L 53/124* (2019.01)
*B60L 53/30* (2019.01)
*B60L 53/60* (2019.01)
*H02J 50/70* (2016.01)

(52) U.S. Cl.
CPC ............ *B60L 53/124* (2019.02); *B60L 53/32* (2019.02); *B60L 53/60* (2019.02); *H02J 50/70* (2016.02)

(58) Field of Classification Search
CPC ........ B60L 53/122; B60L 53/32; B60L 53/68; B60L 53/124; B60L 53/12; B60L 53/126
USPC .......................................................... 320/109
See application file for complete search history.

(56) References Cited

U.S. PATENT DOCUMENTS

2015/0278038 A1* 10/2015 Halker .................. B60L 3/0023 714/3
2016/0046194 A1* 2/2016 Tsukamoto ........... B60L 3/0069 307/104
2021/0009000 A1* 1/2021 Moriya ................... B60L 50/64
2024/0253504 A1* 8/2024 Maemura ................ B60L 53/39
2024/0253505 A1* 8/2024 Hashimoto ............. B60L 53/39
2024/0258835 A1* 8/2024 Maemura ................ B60L 53/12
2024/0258841 A1* 8/2024 Hashimoto ........... B60L 53/124

FOREIGN PATENT DOCUMENTS

JP 2015-008551 A 1/2015

* cited by examiner

*Primary Examiner* — Daniel A Hess
(74) *Attorney, Agent, or Firm* — SoraIP, Inc.

(57) ABSTRACT

The control device for power supply during traveling includes a processor, and the processor determines the type of power transmitting device that transmits power to the vehicle while the vehicle is running, the type of power receiving device installed in the vehicle, and the foreign object detection unit installed in the power transmitting device. An upper limit of power to be transmitted from the power transmitting device to the power receiving device is determined based on the detection range of the means and the positional relationship between the power transmitting device and the power receiving device.

4 Claims, 10 Drawing Sheets

CONTROL DEVICE FOR POWER SUPPLY DURING TRAVELING

CROSS-REFERENCE TO RELATED APPLICATION

This application claims priority to Japanese Patent Application No. 2023-013870 filed on Feb. 1, 2023, incorporated herein by reference in its entirety.

BACKGROUND

1. Technical Field

The present disclosure relates to a control device for power supply during traveling.

2. Description of Related Art

In Japanese Unexamined Patent Application Publication No. 2015-008551 (JP 2015-008551 A), a power supply device is disclosed that includes a substrate, a primary coil disposed on the substrate and generates magnetic flux using alternating current, a cover attached to the substrate to cover the primary coil, and a foreign object detection unit that detects an object present on the cover, and a monitoring unit that monitors the foreign object detection unit.

SUMMARY

The level of an allowable leakage magnetic field (magnetic field leaking from the primary coil) differs depending on the installation location or the like of the primary coil. For example, the amount of foot traffic is completely different between an expressway with no adjacent sidewalks and a general road with an adjacent sidewalk, so the allowable value of the leakage magnetic field is also different. With the technique disclosed in JP 2015-008551 A, such an allowable value of the leakage magnetic field may not be able to be satisfied, and there is room for improvement.

The present disclosure has been made in view of the above circumstances, and an object of the present disclosure is to provide a control device for power supply during traveling that can transmit power to a vehicle while satisfying an allowable value of a leakage magnetic field.

A control device for power supply during traveling according to the present disclosure includes a processor. The processor determines, based on a category of a power transmitting device that transmits power to a vehicle that is traveling, a category of a power receiving device provided in the vehicle, a detection range of a foreign object detection unit provided in the power transmitting device, and a positional relationship between the power transmitting device and the power receiving device, an upper limit of power to be transmitted from the power transmitting device to the power receiving device.

According to the present disclosure, power can be transmitted to the vehicle while satisfying the allowable value of the leakage magnetic field.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A control device for power supply during traveling according to an embodiment of the present disclosure will be described with reference to the drawings. Components in the following embodiments include components that can be easily replaced by those skilled in the art, or components that are substantially the same.

Wireless Power Transmission System

A wireless power transmission system to which a control device for power supply during traveling according to an embodiment is applied will be described with reference to FIGS. 1 to 8.

Figure 1:
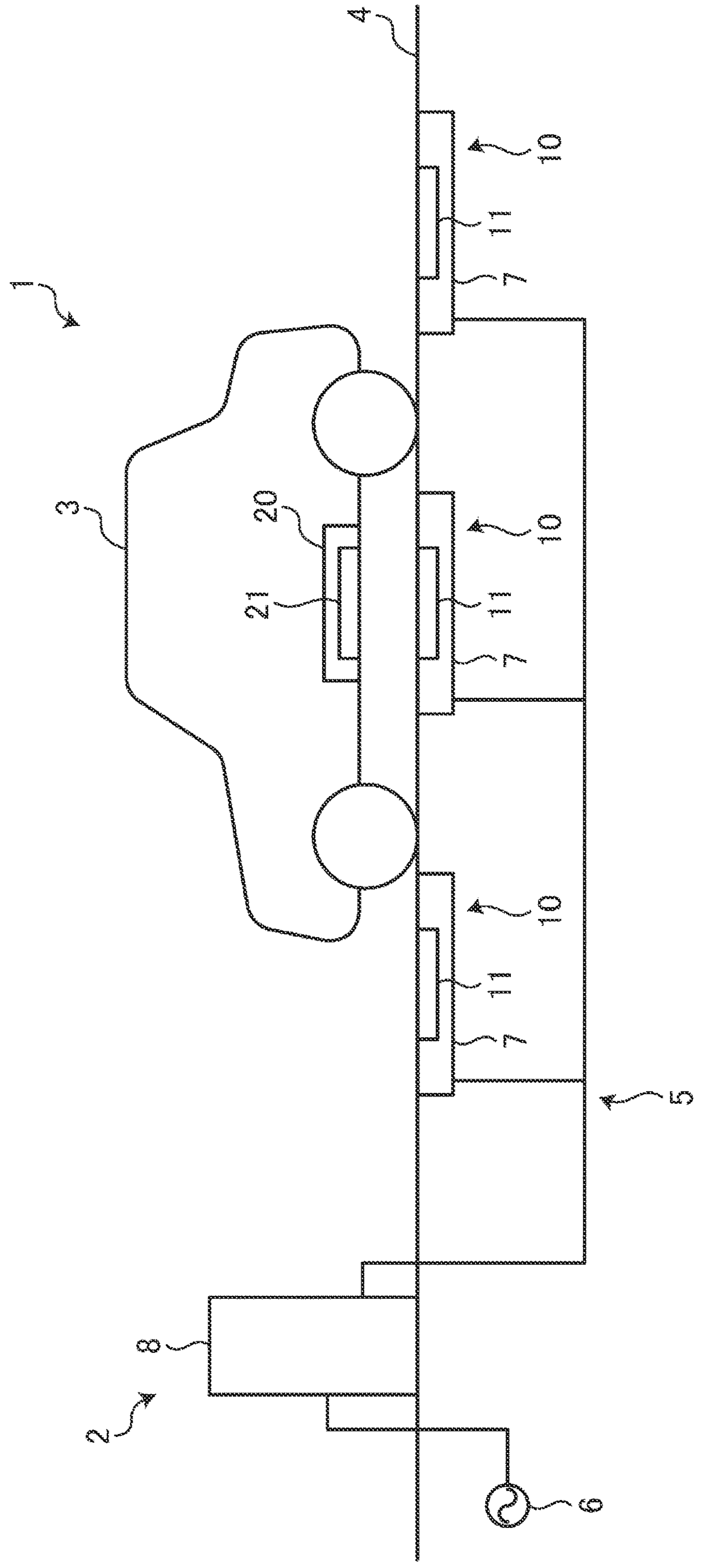
FIG. 1 is a schematic diagram showing a wireless power transmission system to which a control device for power supply during traveling according to an embodiment is applied.

FIG. 1 is a schematic diagram showing a wireless power transmission system according to an embodiment. The wireless power transmission system 1 includes a supply facility 2 and a vehicle 3. The supply facility 2 is a facility that supplies electric power to the running vehicle 3 in a contactless manner. The vehicle 3 is an electrified vehicle that can be charged with electric power supplied from an external power source, such as a battery electric vehicle (BEV) or a plug-in hybrid electric vehicle (PHEV).

This wireless power transmission system 1 performs wireless power transmission from a supply facility 2 to a vehicle 3 by magnetic resonance coupling (magnetic field resonance). A wireless power transmission system 1 transmits power from a supply facility 2 to a vehicle 3 running on a road 4 in a contactless manner. In other words, the wireless power transmission system 1 transmits power by a magnetic resonance method, and realizes power feeding to the vehicle 3 while the vehicle 3 is running by using magnetic resonance coupling (magnetic resonance). The wireless power transmission system 1 can also be expressed as a dynamic wireless power transfer (D-WPT) system or a magnetic field dynamic wireless power transfer (MF-D-WPT) system.

The supply facility 2 includes a supply device 5 and an AC power supply 6 that supplies power to the supply device 5. The supply device 5 transmits power supplied from the AC power supply 6 to the vehicle 3 in a contactless manner. The AC power supply 6 is, for example, a commercial power supply. This supply device 5 comprises a power transmitting device 10 having a primary coil 11.

The supply device 5 includes a segment 7 including the primary coil 11 and a management device 8 that manages the segment 7. Segment 7 is embedded within the lane of road 4. A management device 8 is installed on the side of the road 4. Segment 7 is electrically connected to management device 8. The management device 8 is electrically connected to the AC power supply 6 and supplies power from the AC power supply 6 to the segment 7. Segment 7 is electrically connected to AC power supply 6 via management device 8. A plurality of segments 7 can be arranged along the lanes of the road 4. For example, as shown in FIG. 1, the supply device 5 includes three segments 7 arranged side by side along the lane on the road 4 and one management device 8 to which the three segments 7 are connected. The segment 7 has the function of contactlessly transmitting power from the supply device 5 to the vehicle 3. Management device 8 has the function of controlling wireless power transmission in segment 7.

Vehicle 3 includes power receiving device 20 having secondary coil 21. The power receiving device 20 is provided on the bottom of the vehicle body of the vehicle 3. When the vehicle 3 travels on the road 4 on which the primary coil 11 is installed, the ground-side primary coil 11 and the vehicle-side secondary coil 21 vertically face each other. The wireless power transmission system 1 wirelessly transmits power from the primary coil 11 of the power transmitting device 10 to the secondary coil 21 of the power receiving device 20 while the vehicle 3 is running on the road 4.

The term "running" in this description means that the vehicle 3 is positioned on the road 4 for running. A state in which the vehicle 3 is temporarily stopped on the road 4 is also included during traveling. For example, a state in which the vehicle 3 is stopped on the road 4 due to waiting for a traffic light, etc., is also included in running. On the other hand, even if the vehicle 3 is located on the road 4, for example, if the vehicle 3 is parked or stopped, it is not included in the running state.

Also, in this description, the lane in which the primary coil 11 (segment 7) is embedded is described as a D-WPT lane, and it is a partial section of the road 4 where wireless power transmission by the supply device 5 is possible. This may be referred to as a D-WPT charging site. In the D-WPT lane and the D-WPT charging site, a plurality of primary coils 11 (plurality of segments 7) are arranged in the traveling direction of the vehicle 3 over a predetermined section of the road 4.

Figure 2:
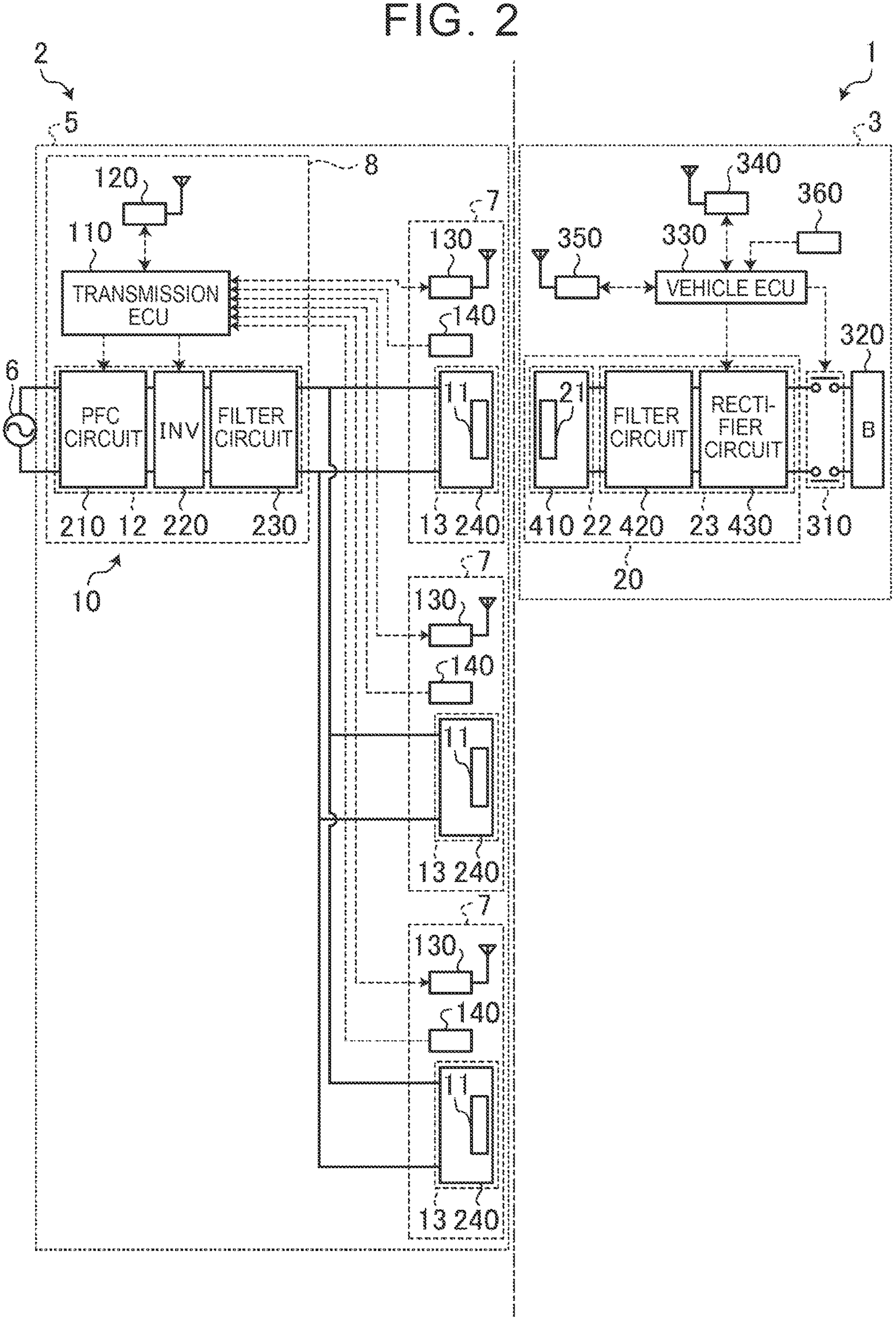
FIG. 2 is a diagram showing the overall configuration of the wireless power transmission system.

FIG. 2 is a diagram showing the overall configuration of the wireless power transmission system. In the supply facility 2, a supply device 5 and an AC power supply 6 are electrically connected. In supply device 5, segment 7 and management device 8 are electrically connected.

The supply device 5 includes a configuration provided in the management device 8 and a configuration provided in the segment 7. The supply device 5 includes a power transmitting device 10, a power transmission electronic control unit (power transmission ECU) 110, a first communication device 120, a second communication device 130, and a foreign object detection device 140. Note that it is not essential that the supply device 5 includes the foreign object detection device 140, and the supply device 5 may not include the foreign object detection device 140.

power transmitting device 10 includes an electrical circuit connected to AC power source 6. The power transmitting device 10 includes a Power Factor Collection (PFC) circuit 210, an inverter (INV) 220, a filter circuit 230, and a power transmission side resonance circuit 240.

PFC circuit 210 improves the power factor of AC power input from AC power supply 6, converts the AC power into DC power, and outputs the DC power to inverter 220. This PFC circuit 210 is configured including an AC/DC converter. PFC circuit 210 is electrically connected to AC power supply 6.

Inverter 220 converts the DC power input from PFC circuit 210 into AC power. Each switching element of the inverter 220 is composed of an Insulated Gate Bipolar Transistor (IGBT), a Metal-Oxide-Semiconductor Field Effect Transistor (MOSFET), etc., and performs a switching operation in response to a control signal from the power transmission ECU 110. For example, the driving frequency of inverter 220 is 85 kHz. Inverter 220 outputs the converted AC power to filter circuit 230.

The filter circuit 230 removes noise contained in the alternating current input from the inverter 220 and supplies the noise-removed alternating current power to the power transmission side resonance circuit 240. Filter circuit 230 is an LC filter that combines a coil and a capacitor. For example, the filter circuit 230 is composed of a T-type filter in which two coils and one capacitor are arranged in a T-shape. PFC circuit 210, inverter 220, and filter circuit 230 configure power conversion section 12 of power transmitting device 10.

The power transmission side resonance circuit 240 is a power transmission unit that transmits the AC power supplied from the filter circuit 230 to the power receiving device 20 in a non-contact manner. When AC power is supplied from the filter circuit 230 to the power transmission side resonance circuit 240, a current flows through the primary coil 11 and a magnetic field for power transmission is generated.

The power transmission side resonance circuit 240 includes a primary coil 11 and a resonance capacitor. The primary coil 11 is a power transmission coil. This resonance capacitor is connected in series to one end of the primary coil 11 and adjusts the resonance frequency of the power transmission side resonance circuit 240. This resonant frequency is between 10 kHz and 100 GHz, preferably 85 kHz. For example, the power transmitting device 10 is configured such that the resonance frequency of the power transmission side resonance circuit 240 and the drive frequency of the inverter 220 match. The power transmission side resonance circuit 240 constitutes the primary device 13 of the power transmitting device 10.

The power transmitting device 10 includes a power conversion unit 12 and a primary device 13. Power conversion unit 12 includes a PFC circuit 210, an inverter 220 and a filter circuit 230. The primary device 13 includes a power transmission side resonance circuit 240. The power transmitting device 10 has a configuration in which a power conversion unit 12 is provided in the management device 8 and a primary device 13 is provided in the segment 7.

In the supply device 5, the power conversion unit 12, the power transmission ECU 110, and the first communication device 120 of the power transmitting device 10 are provided in the management device 8, and the primary device 13 of the power transmitting device 10 and the second communication device 130, and a foreign object detection device (foreign object detection unit) 140 are provided in the segment 7.

The power transmission ECU 110 is an electronic control device that controls the supply device 5. Power transmission ECU 110 includes a processor and a memory. The processor consists of a Central Processing Unit (CPU), a Digital Signal Processor (DSP), a Field-Programmable Gate Array (FPGA), and so on. Memory is a main storage device and consists of Random Access Memory (RAM), Read Only Memory (ROM), etc. The power transmission ECU 110 loads a program stored in a storage unit into a work area of a memory (main storage unit) and executes it, and controls each component through the execution of the program to achieve a function that meets a predetermined purpose. The storage unit is composed of recording media such as Erasable Programmable ROM (EPROM), Hard Disk Drive (HDD), and removable media. Examples of removable media include disc recording media such as Universal Serial Bus (USB) memory, Compact Disc (CD), Digital Versatile Disc (DVD), and Blu-ray (registered trademark) Disc (BD). The storage unit can store an operating system (OS), various programs, various tables, various databases, etc. Signals from various sensors are input to the power transmission ECU 110. A signal from the foreign object detection device 140 is input to the power transmission ECU 110. Power transmission ECU 110 then executes various controls based on signals input from various sensors.

For example, power transmission ECU 110 executes power control to adjust power for transmission. In power control, the power transmission ECU 110 controls the power transmitting device 10. The power transmission ECU 110 outputs a control signal to the power conversion unit 12 in order to control the power supplied from the power conversion unit 12 to the primary device 13. The power transmission ECU 110 controls the switching elements included in the PFC circuit 210 to adjust the power for transmission, and controls the switching elements included in the inverter 220 to adjust the power for transmission.

The power transmission ECU 110 also executes communication control for controlling communication with the vehicle 3. In communication control, power transmission ECU 110 controls first communication device 120 and second communication device 130.

The first communication device 120 is a ground-side communication device that performs wide-area wireless communication. The first communication device 120 performs wireless communication with the vehicle 3 that is before approaching the WPT lane among the vehicles 3 traveling on the road 4. The state before approaching the WPT lane means that the vehicle 3 is in a position where short-range wireless communication cannot be performed with the supply device 5.

Wide-area wireless communication is communication with a communication distance of 10 meters to 10 kilometers. Wide-area wireless communication is communication with a longer communication distance than narrow-area wireless communication. Various types of wireless communication with long communication distances can be used as wide-area wireless communication. For example, communication conforming to communication standards such as 3GPP (registered trademark), 4G, LTE, 5G, and WiMAX established by IEEE is used for wide area wireless communication. In the wireless power transmission system 1, vehicle information associated with vehicle identification information (vehicle ID) is transmitted from the vehicle 3 to the supply device 5 using wide area wireless communication.

The second communication device 130 is a communication device on the ground side that performs short-range wireless communication. The second communication device 130 performs wireless communication with a vehicle 3 that is approaching or entering the WPT lane among the vehicles 3 traveling on the road 4. A state in which the vehicle 3 is close to the WPT lane means that the vehicle 3 is in a position where short-range wireless communication can be performed with the supply device 5.

Short-range wireless communication is communication with a communication range of less than 10 meters. Short-range wireless communication is communication with a shorter communication distance than wide-area wireless communication. Various short-range wireless communications with short communication distances can be used as short-range wireless communications. For example, communication conforming to any communication standard established by IEEE, ISO, IEC, etc. is used for short-range wireless communication. As an example, Wi-Fi (registered trademark), Bluetooth (registered trademark), ZigBee (registered trademark), etc. are used for short-range wireless communication. Alternatively, as a technology for performing short range wireless communication, Radio Frequency Identification (RFID), Dedicated Short Range Communication (DSRC), etc. may be used. In the wireless power transmission system 1, vehicle identification information and the like are transmitted from the vehicle 3 to the supply device 5 using short-range wireless communication.

A foreign object detection device 140 detects a metallic foreign object, a living body, or the like existing above the primary coil 11. The foreign object detection device 140 is composed of, for example, a sensor coil and an imaging device installed on the ground. The foreign object detection device 140 is used to perform Foreign Object Detection (FOD) and Living Object Protection (LOP) functions in the wireless power transmission system 1.

In the supply device 5, the configuration of the power transmitting device 10 is divided into a segment 7 and a management device 8, and the three segments 7 are connected to one management device 8. The power transmitting device 10 is configured such that one inverter supplies power to three power transmission side resonance circuits 240. In the supply device 5, signals from each segment 7 are input to the management device 8. Signals from the second communication device 130 and foreign object detection device 140 provided in the first segment are input to the power transmission ECU 110. Similarly, signals from the second communication device 130 and the foreign object detection device 140 provided in the second segment are input to the power transmission ECU 110. Signals from the second communication device 130 and foreign object detection device 140 provided in the third segment are input to the power transmission ECU 110. The power transmission ECU 110 can grasp the state of each segment 7 based on the signal input from each segment 7.

The vehicle 3 includes a power receiving device 20, a charging relay 310, a battery 320, a vehicle ECU 330, a third communication device 340, a fourth communication device 350, and a Global Positioning System (GPS) receiver 360.

The power receiving device 20 supplies the power received from the power transmitting device 10 to the battery 320. Power receiving device 20 is electrically connected to battery 320 via charging relay 310. The power receiving device 20 includes a power reception side resonance circuit 410, a filter circuit 420, and a rectifier circuit 430.

The power reception side resonance circuit 410 is a power receiving unit that receives power wirelessly transmitted from the power transmitting device 10. The power reception side resonance circuit 410 is configured by a power receiving side resonance circuit including a secondary coil 21 and a resonance capacitor. The secondary coil 21 is a power receiving coil that receives power transmitted from the primary coil 11 in a non-contact manner. This resonance capacitor is connected in series to one end of the secondary coil 21 and adjusts the resonance frequency of the power receiving side resonance circuit. The resonance frequency of the power reception side resonance circuit 410 is determined to match the resonance frequency of the power transmission side resonance circuit 240.

The resonance frequency of the power reception side resonance circuit 410 is the same as the resonance frequency of the power transmission side resonance circuit 240. Therefore, when a magnetic field is generated by the power transmission side resonance circuit 240 while the power reception side resonance circuit 410 faces the power transmission side resonance circuit 240, the vibration of the magnetic field is transmitted to the power reception side resonance circuit 410. The primary coil 11 and the secondary coil 21 will be in a resonance state. When an induced current flows through the secondary coil 21 due to electromagnetic induction, an induced electromotive force is generated in the power reception side resonance circuit 410. The power reception side resonance circuit 410 receives the power transmitted in a contactless manner from the power transmission side resonance circuit 240 in this manner. Then, the power reception side resonance circuit 410 supplies the power received from the power transmission side resonance circuit 240 to the filter circuit 420. The power reception side resonance circuit 410 constitutes the secondary device 22 of the power receiving device 20.

The filter circuit 420 removes noise contained in the AC current input from the power reception side resonance circuit 410 and outputs the noise-free AC power to the rectifier circuit 430. Filter circuit 420 is an LC filter that combines a coil and a capacitor. For example, the filter circuit 420 is composed of a T-type filter in which two coils and one capacitor are arranged in a T-shape.

Rectifier circuit 430 converts the AC power input from filter circuit 420 into DC power and outputs the DC power to battery 320. The rectifier circuit 430 is composed of, for example, a full-bridge circuit in which four diodes are connected as rectifier elements. A switching element is connected in parallel to each diode of the rectifier circuit 430. Each switching element of the rectifier circuit 430 is constituted by an IGBT, and performs a switching operation in response to a control signal from the vehicle ECU 330. Rectifier circuit 430 supplies the converted DC power to battery 320. Filter circuit 420 and rectifier circuit 430 configure power conversion section 23 of power receiving device 20.

The power receiving device 20 includes a secondary device 22 and a power conversion unit 23. The secondary device 22 includes a power reception side resonance circuit 410. Power conversion unit 23 includes a filter circuit 420 and a rectifier circuit 430.

Charging relay 310 is provided between rectifier circuit 430 and battery 320. The opening/closing state of charging relay 310 is controlled by vehicle ECU 330. When the battery 320 is charged by the power transmitting device 10, the charging relay 310 is controlled to be closed. When charging relay 310 is closed, rectifier circuit 430 and battery 320 are electrically connected. When charging relay 310 is open, the connection between rectifier circuit 430 and battery 320 is disabled. For example, when charging relay 310 is in an open state, vehicle 3 does not request power supply.

The battery 320 is a rechargeable DC power supply, and is composed of, for example, a lithium ion battery or a nickel metal hydride battery. The battery 320 stores power supplied from the power transmitting device 10 to the power receiving device 20. Also, the battery 320 can supply electric power to the driving motor of the vehicle 3. The battery 320 is electrically connected to the travel motor via a power control unit (PCU). The PCU is a power conversion device that converts the DC power of the battery 320 into AC power and supplies it to the driving motor. Each switching element of the PCU is composed of an IGBT, and performs a switching operation in response to a control signal from the vehicle ECU 330 or the like.

A vehicle ECU 330 is an electronic control unit that controls the vehicle 3. The vehicle ECU 330 has the same hardware configuration as the power transmission ECU 110. Signals from various sensors mounted on the vehicle 3 are input to the vehicle ECU 330. A positioning signal received by the GPS receiver 360 is also input to the vehicle ECU 330. Vehicle ECU 330 can acquire current position information of vehicle 3 from GPS receiver 360. Vehicle ECU 330 then executes various controls based on signals input from various sensors.

For example, the vehicle ECU 330 performs contactless charging control to transmit power from the primary coil 11 to the secondary coil 21 in a contactless manner and store the power received by the secondary coil 21 in the battery 320. In non-contact charging control, vehicle ECU 330 controls rectifier circuit 430, charging relay 310, third communication device 340, and fourth communication device 350. The non-contact charging control includes power control for controlling charging power and communication control for controlling communication with the supply device 5. In power control, vehicle ECU 330 controls switching elements included in rectifier circuit 430 to adjust the power (charging power) supplied from power receiving device 20 to battery 320. In communication control, vehicle ECU 330 controls third communication device 340 and fourth communication device 350.

The third communication device 340 is a vehicle-side communication device that performs wide-area wireless communication. The third communication device 340 wirelessly communicates with the first communication device 120 of the supply device 5 before the vehicle 3 traveling on the road 4 approaches the WPT lane. Wide area wireless communication is two-way wireless communication. Communication between the first communication device 120 and the third communication device 340 is performed by high-speed wireless communication.

The fourth communication device 350 is a vehicle-side communication device that performs short-range wireless communication. The fourth communication device 350 wirelessly communicates with the second communication device 130 of the supply device 5 when the vehicle 3 approaches or enters the WPT lane. Short-range wireless communication is unidirectional wireless signaling. Unidirectional wireless signaling is Point to point signaling (P2PS). P2PS is used for notifying vehicle identification information from the vehicle 3 to the supply device 5 in each activity of pairing, alignment check, magnetic coupling check, and power transfer end. P2PS can also be used as a lateral alignment check. The lateral direction is the width direction of the lane, and the width direction of the vehicle 3.

GPS receiver 360 detects the current position of vehicle 3 based on positioning information obtained from a plurality of positioning satellites. Current position information of vehicle 3 detected by GPS receiver 360 is transmitted to vehicle ECU 330.

In addition, in the supply device 5, the filter circuit 230 may be included in the management device 8 instead of the segment 7. That is, the filter circuit 230 may be installed on the side of the road 4. In this case, the power conversion unit 12 includes a PFC circuit 210, an inverter 220 and a filter circuit 230, and the primary device 13 includes a power transmission side resonance circuit 240.

Further, the filter circuit 230 may be provided individually for each primary coil 11 or may be provided collectively for a plurality of primary coils 11.

Moreover, the filter circuit 230 is not limited to a T-type filter, and may be, for example, a band-pass filter in which a coil and a capacitor are connected in series. This is the same for the filter circuit 420 of the vehicle 3 as well.

Further, in the power transmitting device 10, when the inverter 220 is connected to the plurality of primary coils 11, each primary device 13 may be provided with a switch for switching the primary coil 11 to be energized. This change-over switch may be provided in the management device 8 beside the road 4 or may be provided near the primary coil 11.

Moreover, the power transmission side resonance circuit 240 is not limited to the configuration in which the primary coil 11 and the resonance capacitor are connected in series. The primary coil 11 and resonant capacitor may be connected in parallel, or may be a combination of parallel and series. In short, the power transmission side resonance circuit 240 only needs to be configured such that the resonance frequency of the power transmission side resonance circuit 240 matches the driving frequency of the inverter 220, and the connection relationship of the components is not particularly limited. The same applies to the power reception side resonance circuit 410 of the vehicle 3.

Further, the drive frequency of inverter 220 is not limited to 85 kHz, and may be a frequency around 85 kHz. In short, the driving frequency of inverter 220 may be a predetermined frequency band including 85 kHz.

Further, the power transmitting device 10 may have a configuration in which a plurality of inverters 220 is connected to the output side power line (DC power line) of the PFC circuit 210.

Moreover, the foreign object detection device 140 may be provided not only on the ground side but also on the vehicle 3 side. For example, when a foreign object detection device on the side of the vehicle 3 detects a foreign object or a living body existing above the primary coil 11, the power supply request can be stopped until the vehicle 3 passes the primary coil 11.

In the wireless power transmission system 1, information transmitted from the vehicle 3 to the supply device 5 using short-range wireless communication includes vehicle identification information, a power supply request, a power supply request value, and the like. A power supply request is information indicating a request for power transmission from the primary coil 11. The power supply request value is a request value for the amount of power transmitted from the supply device 5 to the vehicle 3. Vehicle ECU 330 can calculate the power supply request value based on the SOC of battery 320.

Moreover, the wireless power transmission system 1 is not limited to the method of supplying power from the ground to the vehicle 3, and can realize the method of supplying power from the vehicle 3 to the ground. In this case, the rectifier circuit 430 can be replaced with an inverter to achieve rectification during power supply and power reception.

Figure 3:
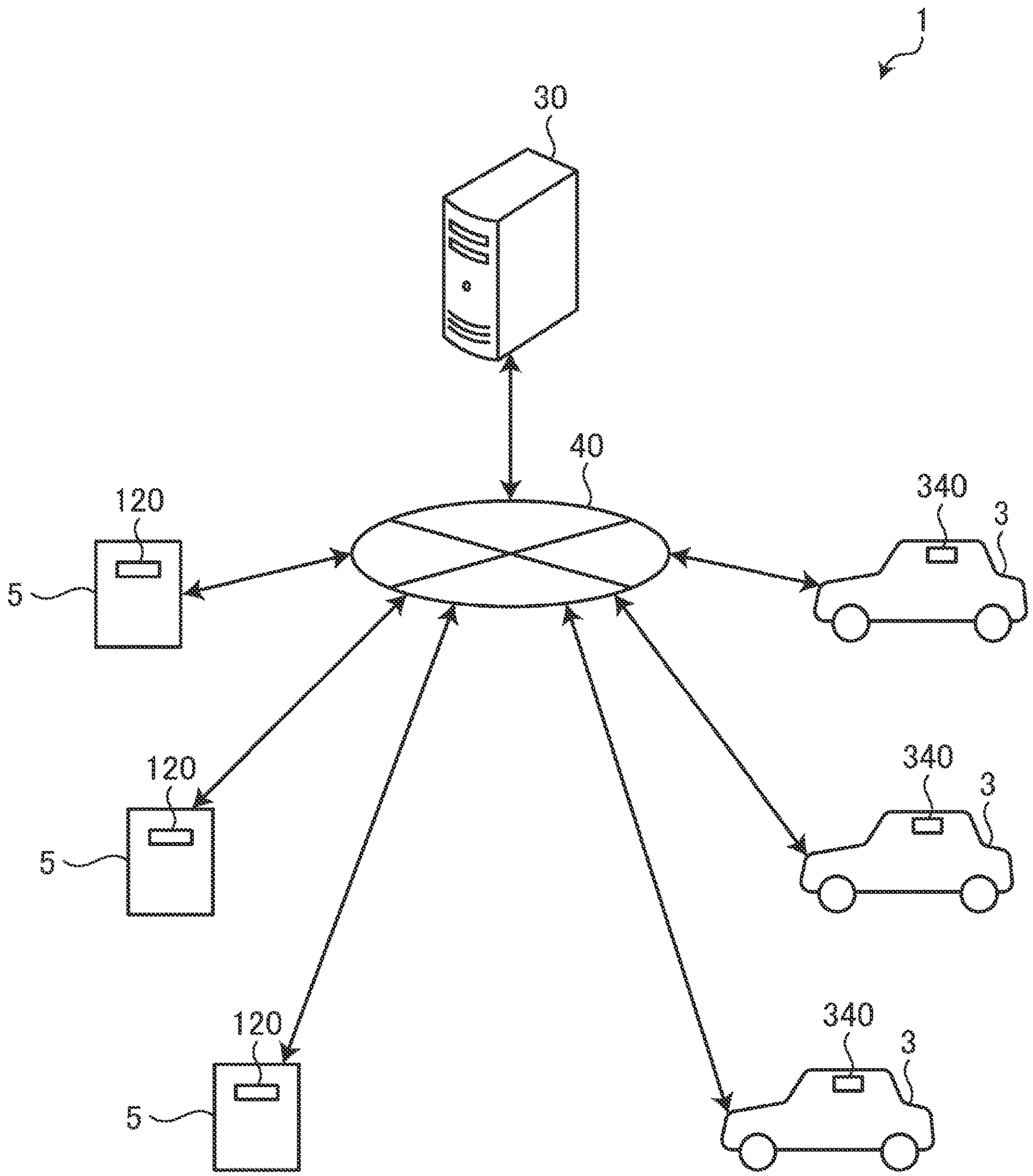
FIG. 3 is a schematic diagram for explaining wide area wireless communication in a wireless power transmission system.

FIG. 3 is a schematic diagram for explaining wide-area wireless communication in the wireless power transmission system.

In the wireless power transmission system 1, the vehicle 3 can communicate with the server 30 and the supply device 5 can communicate with the server 30. The server 30 is connected to a network 40 and can communicate with multiple vehicles 3 and multiple supply devices 5 via the network 40. The network 40 includes a Wide Area Network (WAN), which is a public communication network such as the Internet, a telephone communication network of a mobile phone, and the like.

The vehicle 3 connects to the network 40 through wide area wireless communication using the third communication device 340. Vehicle 3 transmits information to server 30 and receives information from server 30.

The supply device 5 connects to the network 40 by wide area wireless communication using the first communication device 120. The supply device 5 transmits information to the server 30 and receives information from the server 30.

Figure 4:
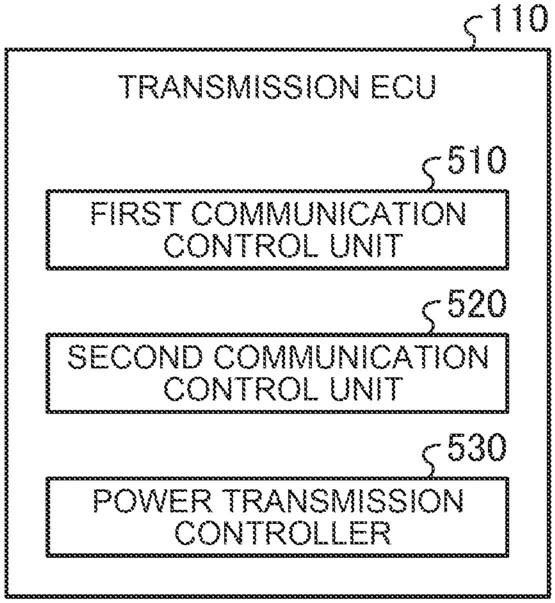
FIG. 4 is a block diagram for explaining the functional configuration of the power transmission ECU.

FIG. 4 is a block diagram showing the functional configuration of the power transmission ECU. Power transmission ECU 110 includes a first communication control unit 510, a second communication control unit 520, and a power transmission control unit 530.

The first communication control unit 510 executes first communication control for controlling the first communication device 120. The first communication control controls wide-area wireless communication on the supply device 5 side, and controls communication of the supply device 5 using the first communication device 120. That is, the first communication control controls communication of the management device 8 of the supply device 5. The first communication control controls communication between the supply device 5 and the network 40 and controls communication between the supply device 5 and the server 30 via the network 40. The first communication control unit 510 is a Supply Equipment Communication Controller (SECC).

The second communication control unit 520 executes second communication control for controlling the second communication device 130. The second communication control controls short-range wireless communication on the supply device 5 side, and controls communication of the supply device 5 using the second communication device 130. That is, the second communication control controls communication of the segment 7 of the supply device 5. The second communication control controls communication between the supply device 5 and the vehicle 3 as communication not via the network 40. The second communication control unit 520 is a Primary Device Communication Controller (PDCC).

The power transmission control unit 530 executes power transmission control for controlling the power transmitting device 10. Power transmission control controls power for transmission, and controls the power conversion unit 12 of the power transmitting device 10. Power transmission control unit 530 performs power control to control PFC circuit 210 and inverter 220.

Figure 5:
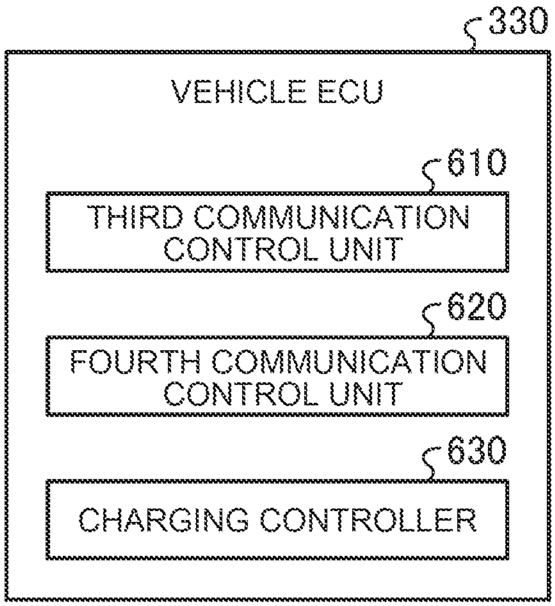
FIG. 5 is a block diagram for explaining the functional configuration of the vehicle ECU.

FIG. 5 is a block diagram showing the functional configuration of the vehicle ECU. Vehicle ECU 330 includes a third communication control unit 610, a fourth communication control unit 620, and a charging control unit 630.

The third communication control unit 610 executes third communication control for controlling the third communication device 340. The third communication control controls wide-area wireless communication on the vehicle 3 side, and controls communication of the vehicle 3 using the third communication device 340. The third communication control controls communication between the vehicle 3 and the network 40 and also controls communication between the vehicle 3 and the server 30 via the network 40. The third communication control unit 610 is an EV Communication Controller (EVCC).

The fourth communication control unit 620 executes fourth communication control for controlling the fourth communication device 350. The fourth communication control controls short-range wireless communication on the vehicle 3 side, and controls communication of the vehicle 3 using the fourth communication device 350. The fourth communication control controls communication between the vehicle 3 and the supply device 5 as communication not via the network 40. The fourth communication control unit 620 is a secondary device communication controller.

Charging control unit 630 executes charging control to control power receiving device 20 and charging relay 310. Charging control includes power control for controlling received power in power receiving device 20 and relay control for controlling the connection state between secondary device 22 and battery 320. Charging control unit 630 performs power control to control rectifier circuit 430. Charging control unit 630 performs relay control to switch the open/closed state of charging relay 310.

In the wireless power transmission system 1 configured as described above, wireless power transmission from the supply device 5 to the vehicle 3 is performed in a state where wireless communication is established between the vehicle 3 and the supply device 5. In a state in which the vehicle 3 and the supply device 5 are paired by wireless communication, power is transmitted from the primary coil 11 on the ground side to the secondary coil 21 on the vehicle side in a non-contact manner. Then, in the vehicle 3, charging control is performed to supply the electric power received by the secondary coil 21 to the battery 320.

Next, the power transmission process (D-WPT process) will be described with reference to FIG. 6. The power transfer process is structured as a chain of activities, a process derived from states and corresponding transitions.

Figure 6:
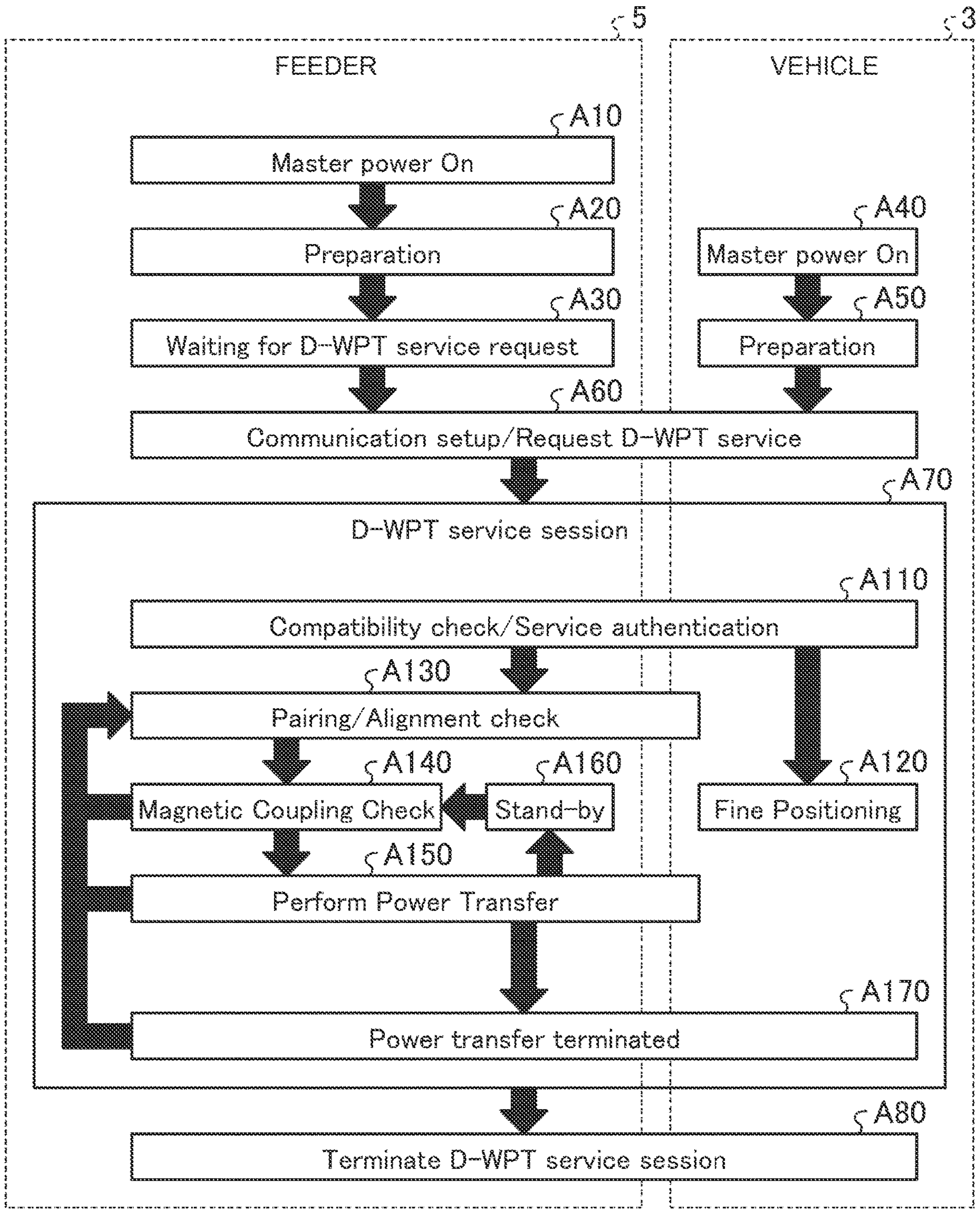
FIG. 6 is a diagram for explaining the power transfer process.

FIG. 6 is a diagram for explaining the power transmission process. FIG. 6 shows basic activities to explain the power transfer process. The thick arrows shown in FIG. 6 represent transition lines. The state of the wireless power transmission system 1 in the power transfer process is represented by the activities that make up the power transfer process.

The activities that make up the power transmission process are a power transmission service session (D-WPT service session A70) that is an activity in the stage of power transmission, an activity before power transmission, and an activity after power transmission. Further, the activity can be explained by dividing the subject of action according to the presence or absence of communication between the supply device 5 and the vehicle 3. Activities represent the state of only the supply device 5 side without communication, the state of only the vehicle 3 side without communication, and the state of both the supply device 5 and the vehicle 3 with communication.

As shown in FIG. 6, the activities include master power on state (Master power on) A10, preparation A20, waiting for a request from vehicle 3 (Waiting for D-WPT service request) A30, master power on state (Master power On) A40, preparation A50, Communication setup and Request D-WPT service A60, D-WPT service session A70, and Terminate D-WPT service session A80.

Preparation A20 is the preparation state of the supply device 5. In preparation A20, the supply device 5 performs circuit activation and safety confirmation without communication with the vehicle 3. The supply device 5 transitions to the preparation

A20 state when the master power supply is turned on A10. If the supply device 5 activates the circuit and confirms safety in preparation A20, the state changes to waiting for a request from vehicle 3 (Waiting for D-WPT service request) A30. On the other hand, when there is a problem with the supply device 5, the supply device 5 notifies the vehicle 3 of information indicating that the wireless power transmission system 1 cannot be used (unusable notification) through wide area wireless communication. The first communication device 120 transmits a usage prohibition notice to the vehicle 3.

Preparation A50 is the preparation state of the vehicle 3. In preparation A50, the vehicle 3 performs circuit activation and safety checks without communication with the supply device 5. The vehicle 3 transitions to the state of preparation A50 when the master power supply is turned on A40. If the vehicle 3 activates the circuit and confirms safety in preparation A50, the state changes to communication setup and request D-WPT service A60. On the other hand, if there is a problem with vehicle 3, vehicle 3 will not initiate wide area wireless communication and will not proceed with subsequent sequences in the D-WPT process.

Figure 7:
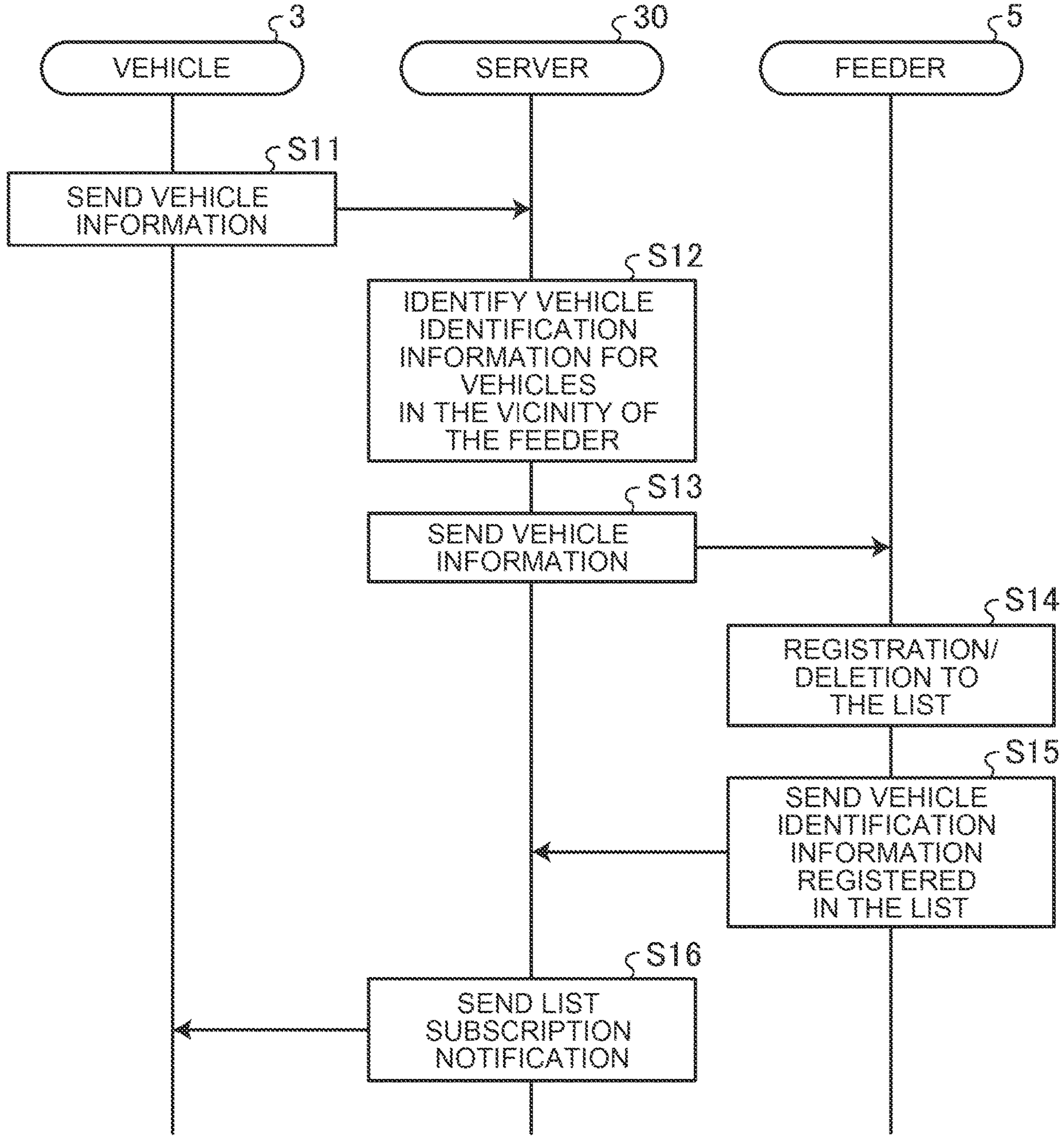
FIG. 7 is a sequence diagram showing a case where communication using wide area wireless communication is carried out between a vehicle and a supply device.

A request for communication setup and D-WPT service A60 is initiated by the vehicle ECU 330. In communication setup and D-WPT service request A60, vehicle ECU 330 starts wide area wireless communication. First, when the vehicle 3 transitions from preparation A50 to communication setup and D-WPT service request A60, the third communication device 340 transmits a D-WPT service request signal. The third communication device 340 wirelessly communicates with the first communication device 120 corresponding to the D-WPT lane that the vehicle 3 is planning to enter or has entered. The first communication device 120 to communicate with is selected based on the relative positional relationship between the current position of the vehicle 3 and the position of the D-WPT lane. On the supply device 5 side, when the first communication device 120 receives the D-WPT service request signal in the state of waiting for a request from the vehicle 3 A30, the state transitions to the communication setting and D-WPT service request A60. Various types of information in wide area wireless communication and P2PS communication are linked using vehicle identification information. FIG. 7 shows the processing sequence of this communication setup and D-WPT service request A60.

FIG. 7 is a sequence diagram showing a case where communication using wide area wireless communication is performed between the vehicle and the supply device. The vehicle 3 transmits vehicle information to the server 30 (S11). In S11, the third communication device 340 of the vehicle 3 transmits vehicle information to the server 30. The vehicle information includes vehicle identification information, various parameters of the power receiving device 20, current position information of the vehicle 3, and requested power. Vehicle ECU 330 calculates the required power based on the State of Charge (SOC) of battery 320. In S11, the vehicle ECU 330 causes the third communication device 340 to transmit vehicle information at predetermined time intervals. The predetermined time is set according to the distance from the current position of the vehicle 3 to the starting point of the WPT lane. The shorter the distance from the vehicle 3 to the starting point of the WPT lane, the shorter the predetermined time interval.

When the server 30 receives the vehicle information from the vehicle 3, the server 30 specifies the vehicle identification information of the vehicle 3 located within the vicinity area of the supply device 5 based on the current position information of the vehicle 3 included in the vehicle information (S12). In S12, the server 30 identifies the vehicle 3 positioned within a predetermined vicinity area from the supply device 5 based on the current position information of the vehicle 3 and the position information of the supply device 5. The neighboring area is set within, for example, 500 meters.

After specifying the vehicle identification information of the vehicle 3, the server 30 transmits the vehicle information to the supply device 5 (S13). At S13, the transmission device of the server 30 transmits vehicle information to the supply device 5.

When the supply device 5 receives the vehicle information from the server 30, the supply device 5 registers/deletes the vehicle identification information in the identification information list (S14). In S14, the power transmission ECU 110 registers/deletes the vehicle identification information in the identification information list so that the vehicle identification information linked to the vehicle information is registered in the identification information list without excess or deficiency.

After registering/erasing the vehicle identification information in the identification information list, the supply device 5 transmits the vehicle identification information registered in the identification information list to the server 30 (S15). At S15, the first communication device 120 of the supply device 5 transmits the vehicle identification information to the server 30.

When the server 30 receives the vehicle identification information from the supply device 5, the server 30 transmits a list registration notification to the vehicle 3 corresponding to the vehicle identification information registered in the identification information list (S16). In S16, the communication device of server 30 transmits a list registration notification to vehicle 3. The list registration notification is a notification indicating that the vehicle identification information is registered in the identification information list, and includes identification information of the supply device 5 and position information of the supply device 5.

Thus, when the vehicle 3 starts wide area wireless communication and both the supply device 5 and the vehicle 3 are in the state of communication setting and D-WPT service request A60, the communication setting by wide area wireless communication is successful. With the success of this communication setup, the state transitions to D-WPT service session A70.

Return to FIG. 6. The D-WPT service session A70 contactlessly transmits power from the power transmission side resonance circuit 240 of the supply device 5 to the power reception side resonance circuit 410 of the vehicle 3 in a state where the communication connection is established between the supply device 5 and the vehicle 3. The D-WPT service session A70 begins with successful communication setup and ends with the termination of communication. When communication ends in the D-WPT service session A70 state, the state transitions to Terminate D-WPT service session A80.

At the end of the D-WPT service session A80, the vehicle 3 terminates the wide area wireless communication with the supply device 5. The vehicle 3 and the supply device 5 can receive a trigger to terminate the D-WPT service session A70. Then, the vehicle ECU 330 prevents the secondary device 22 and the vehicle 3 from starting D-WPT until the third communication device 340 receives the next notification (D-WPT service request signal).

The detailed activities of D-WPT service session A70 will now be described.

The D-WPT service session A70 includes a Compatibility check and Service authentication A110, a Fine Positioning A120, a Pairing and Alignment check A130, Magnetic Coupling Check A140, Perform Power Transfer A150, Stand-by A160, and Power transfer terminated A170.

Compatibility check and service authentication A110 will be described. After successful communication setup, vehicle ECU 330 and power transmission ECU 110 confirm that primary device 13 and secondary device 22 are compatible. The compatibility check is performed on the supply device 5 side based on the information associated with the vehicle identification information acquired by communication. Check items include the minimum ground clearance of the secondary device 22, the shape type of the secondary device 22, the circuit topology of the secondary device 22, the self-resonant frequency of the secondary device 22, the number of secondary coils 21, and the like.

In the compatibility check and service authentication A110, first, the vehicle 3 transmits compatibility information of the power receiving device 20 from the third communication device 340 to the supply device 5. The first communication device 120 of the supply device 5 receives the compatibility information of the power receiving device 20 from the vehicle 3. Then, the first communication device 120 of the supply device 5 transmits the compatibility information of the power transmitting device 10 to the vehicle 3. The third communication device 340 of the vehicle 3 receives the compatibility information of the power transmitting device 10 from the supply device 5.

Elements of compatibility information that the vehicle 3 transmits to the supply device 5 include vehicle identification information, WPT Power Classes, Air Gap Class, WPT Operating Frequencies, WPT frequency adjustment, WPT Type, WPT Circuit Topology, Fine Positioning Method, Pairing Method, Alignment Method, power adjustment function presence/absence information, and the like.

Elements of compatibility information that feeder 5 sends to vehicle 3 include feeder identification, WPT power class, gap class, WPT drive frequency, WPT frequency adjustment, WPT type, WPT circuit topology, detailed alignment method, It includes the pairing method, the alignment method, information on the presence or absence of the power adjustment function, and the like.

Each element name is explained in detail. Each element of the compatibility information transmitted from the vehicle 3 to the supply device 5 will be described. In the description of the compatibility information transmitted from the supply device 5 to the vehicle 3, the description overlapping with description of the compatibility information transmitted from the vehicle 3 to the supply device 5 will be omitted.

A gap class is information indicating a gap class that the secondary device 22 can receive power from. The WPT power class is information indicating the power class that the secondary device 22 can receive. The WPT drive frequency is information indicating the frequency of received power received by the secondary device 22. The WPT frequency adjustment is information indicating whether or not the driving frequency can be adjusted. The WPT type is information indicating the shape type of the secondary device 22 and indicates the coil shape of the secondary coil 21. Examples of the WTP type include circular and solenoid. The WPT circuit topology is information indicating the connection structure between the secondary coil 21 and the resonant capacitor. WTP circuit topologies include series and parallel. The detailed alignment method is information indicating by what method the alignment is to be performed. The pairing method is a method of performing pairing by which the vehicle 3 identifies the supply device 5. The alignment method indicates a method of confirming the relative positions of the secondary device 22 and the primary device 13 before starting power transmission.

Fine positioning A120 will be described. Vehicle 3 performs fine positioning A120 prior to pairing and alignment check A130 or in parallel with these activities. When the vehicle ECU 330 determines that the vehicle 3 has approached or entered the area (WPT lane) where the supply device 5 is installed, it starts fine positioning A120.

Vehicle ECU 330 guides vehicle 3 to align primary device 13 and secondary device 22 within a range that establishes sufficient magnetic coupling for wireless power transfer.

Fine positioning A120 is basically performed manually or automatically on the vehicle 3 side. The fine positioning A120 can cooperate with ADAS (Automatic Driving Assistance System).

The fine positioning A120 activity then continues until the vehicle 3 leaves the D-WPT charging site or the state changes to end of communication, and the location data transmitted from the feeder 5 to the vehicle 3 by wide area wireless communication is It can be performed based on alignment information. This end of communication is the end A80 of the D-WPT service session.

Pairing and alignment check (Pairing/Alignment check) A130 will be explained. Here, pairing and alignment check will be explained separately.

Explain pairing. A P2PS interface with short-range wireless communication ensures that the primary device 13 and the secondary device 22 are uniquely paired. The pairing state process is as follows.

First, the vehicle ECU 330 recognizes that the vehicle 3 has approached or entered the D-WPT lane. For example, the vehicle ECU 330 has map information including the D-WPT lane, and compares it with the position information of the own vehicle obtained by the GPS receiver 360 to recognize the approach or entry based on the straight line distance etc. The vehicle 3 transmits which D-WPT lane it has approached to the server 30 by wide area wireless communication. In short, the third communication device 340 notifies the cloud of a signal indicating that the vehicle 3 is approaching one of the D-WPT lanes. In addition, when the vehicle ECU 330 recognizes the approach or entry of the vehicle 3 into the D-WPT lane, the fourth communication device 350 will, at regular intervals, for pairing the primary device 13 and the secondary device 22. Start transmitting the modulated signal.

Further, the supply device 5 may recognize that the vehicle 3 has approached or entered the D-WPT lane using information obtained from the server 30 through wide area wireless communication. The server 30 assigns the vehicle identification information of the vehicle 3 approaching in each D-WPT lane to the supply device 5 corresponding to that lane. Since the supply device 5 only needs to refer to the vehicle identification information whose number has been narrowed down by the server 30, the authentication process can be completed in a short time. When the supply device 5 recognizes that the vehicle 3 is approaching the D-WPT lane, the second communication device 130 goes into standby mode. In standby mode, it waits to receive a modulated signal from the fourth communication device 350 of the vehicle 3. This modulated signal contains vehicle identification information.

When the second communication device 130 receives the modulated signal from the vehicle 3, the supply device 5 compares the vehicle identification information received by the short-range wireless communication with the vehicle identification information in the identification information list obtained by a result of the wide-area wireless communication with the plurality of vehicles 3 approaching the D-WPT lane. By means of this comparison, supply device 5 identifies vehicle 3.

When the vehicle ECU 330 recognizes that the vehicle 3 is out of the D-WPT lane, it stops transmitting the modulated signal from the fourth communication device 350. The vehicle ECU 330 can determine whether the vehicle has passed through the D-WPT lane based on the map information and the position information of the own vehicle.

When the supply device 5 determines that the vehicle 3 is not traveling in the D-WPT lane or determines that the vehicle 3 is not approaching the D-WPT lane, the modulated signal from the fourth communication device 350 stop waiting for Pairing is performed to the primary device 13 until the vehicle 3 exits the D-WPT charging site or the state changes to end of communication. When Pairing is complete, the state transitions to Alignment check.

Alignment check will be explained. The alignment check is intended to ensure that the lateral distance between the primary device 13 and the secondary device 22 is within tolerance. The alignment check is done using short range wireless communication (P2PS).

Alignment checks continue to be performed on a P2PS basis until the vehicle 3 leaves the D-WPT charging site or the state changes to End of Communication. The results of the alignment check can be transmitted from the first communication device 120 to the third communication device 340 via wide area wireless communication.

The magnetic coupling check A140 will be explained. In the magnetic coupling check A140, the supply device 5 confirms the magnetic coupling state and confirms that the secondary device 22 exists within the allowable range. When the magnetic coupling check A140 ends, the state transitions to the execution of perform power transfer A150.

The perform power transfer A150 will be described. In this state, the supply device 5 performs power transmission to the power receiving device 20. The power transmitting device 10 and the power receiving device 20 need to have the ability to control the transmitted power (transmitted power and received power) for the usefulness of the MF-D-

WPT and the protection of the power receiving device 20 and the battery 320. Greater power transfer helps power receiving device 20 travel longer distances without static wireless charging and conductive charging. However, the capacity of the battery 320 varies depending on the vehicle type of the vehicle 3, and the power demand for driving may fluctuate abruptly. This abrupt change includes abrupt regenerative braking. When the regenerative braking is performed while traveling in the D-WPT lane, the regenerative braking is given priority. Therefore, in addition to the regenerative power, the received power from the power receiving device 20 is supplied to the battery 320. In this case, in order to protect the battery 320 from overcharging, it is necessary to adjust the transmission power by the power receiving device 20.

Despite the need for power control, no new communication is initiated between the supply device 5 and the power receiving device 20 in this state. This is because communication can impair responsiveness and accuracy in power control due to its instability and latency. Therefore, the supply device 5 and the power receiving device 20 perform power transmission and control based on known information up to this state.

The supply device 5 increases the transmission power for the magnetic coupling check in advance in response to the power request transmitted from the third communication device 340 using wide area wireless communication. The feeder 5 attempts to keep the current and voltage fluctuations within its bounds while maximizing the power transferred during the transition.

The power receiving device 20 basically receives power transmitted from the power transmitting device 10 without any control. However, the power receiving device 20 starts control when the transmitted power exceeds or is about to exceed the limit, such as the rated power of the battery 320 that fluctuates according to the state of charge and the power demand for driving the vehicle 3. In addition, the power control in the vehicle ECU 330 is also required to cope with malfunctions in wide area wireless communication. This malfunction leads to a contradiction between the power control target in the primary device 13 and the request from the third communication device 340, and sudden failure of the power receiving device 20 and the battery 320 during power transmission. The power receiving device 20 controls the transmitted power under the power request rate notified by the first communication device 120.

Power requirements are determined based on compatibility check information such as vehicle 3 and primary device 13 WPT circuit topology, geometry, ground clearance, EMC (electromagnetic compatibility). The magnetic field differs according to these specifications, and it is necessary to transmit power within a range that satisfies EMC.

Power control in power transmission ECU 110 and power receiving device 20 may interfere with each other. In particular, it may interfere if the supply device 5 attempts to achieve a power demand greater than the current power limit at the power receiving device 20 via wide area wireless communication. An example of this is rapid regenerative control with a relatively small battery 320 in vehicle 3. If possible, it is desirable that the supply device 5 be able to detect mismatches between power control targets and limits and adjust power transfer to overcome the mismatches.

For example, if a foreign object on primary device 13 is detected by foreign object detection device 140, or if secondary device 22 is misaligned and the magnetic coupling is low, secondary device 22 is still above primary device 13. If power transfer is interrupted for a short period of time, the state transitions to Stand-by A160. In addition, when the vehicle 3 is provided with a foreign object detection device, the foreign object may be detected on the vehicle 3 side.

When the secondary device 22 passes over the primary device 13, the state transitions to Power transfer terminated A170. In this case, less power is transferred because the magnetic coupling between the two devices is weaker. Since the supply device 5 can detect that the magnetic coupling has weakened by monitoring the transmitted power, the supply device 5 basically determines the state transition to the Power transfer terminated A170, and then the power Start dropping voltage to stop transmission.

The standby A160 will be explained. In this state the power transfer is briefly interrupted for some reason and when the D-WPT is ready in both the vehicle 3 and the feeder 5 the state returns to Perform Power Transfer A150. If there is a possibility of interrupting power transfer, the state will be standby A160.

Figure 8:
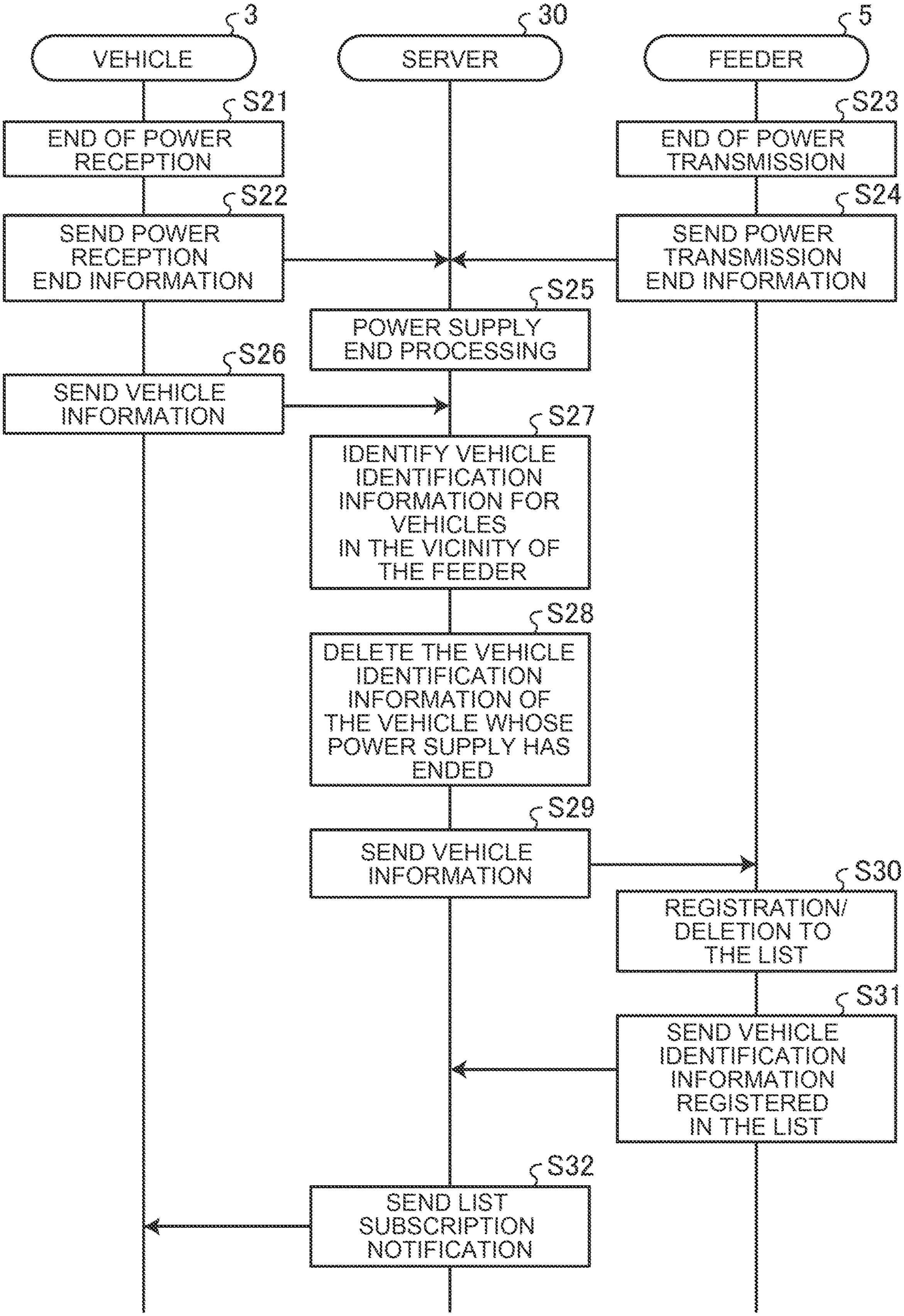
FIG. 8 is a sequence diagram showing the operation after the supply device finishes supplying power to the vehicle while running.

The Power transfer terminated A170 will be described. In this state, the supply device 5 reduces the transmitted power to zero and retains or uploads power transmission result data such as total transmitted power, power transmission efficiency, and failure history. Each data is tagged with vehicle identification information. Finally, the supply device 5 deletes the vehicle identification information of the vehicle 3 that has passed through the D-WPT lane. This allows the supply device 5 to be ready for subsequent pairing and power transfer to another vehicle. FIG. 8 shows the processing sequence of the Power transfer terminated A170.

FIG. 8 is a sequence diagram showing the operation after the power supply from the supply device to the vehicle during running is completed. When the power receiving device 20 of the vehicle 3 finishes receiving power from the supply device 5 (S21), the vehicle 3 transmits power receiving end information to the server 30 (S22). In S22, power reception end information is transmitted from the third communication device 340 of the vehicle 3. The power reception end information includes, as information related to power reception from the supply device 5, vehicle identification information of the vehicle 3, power received from the supply device 5, power reception efficiency, and an abnormality detection result, for example.

The supply device 5 ends power transmission to the vehicle 3 when the process of S21 is performed (S23). The processing of S21 and the processing of S23 may or may not be performed at the same time. When the process of S23 is performed, the supply device 5 transmits power transmission end information to the server 30 (S24). In S24, power transmission end information is transmitted from the first communication device 120 of the supply device 5.

When receiving the power reception end information from the vehicle 3 and the power transmission end information from the supply device 5, the server 30 performs power supply end processing for ending power supply from the supply device 5 to the vehicle 3 (S25). In the power supply end process, based on the power reception end information and the power transmission end information, a process of calculating the amount of power supplied from the supply device 5 to the vehicle 3 and a process of charging the user of the vehicle 3 based on the calculated amount of power supplied are performed.

In addition, the vehicle 3 transmits vehicle information to the server 30 regardless of the power supply termination process (S26). In S26, vehicle information is transmitted from the third communication device 340 of the vehicle 3.

When the server 30 receives the vehicle information from the vehicle 3 after performing the power supply termination process, the server 30 specifies the vehicle identification information of the vehicle 3 located within the vicinity area of each supply device 5 based on the vehicle information (S27).

Then, if a supply device 5 has already completed power feeding to a vehicle 3, the server 30 deletes, from the vehicle identification information of the vehicle 3 in the vicinity area of the supply device 5 specified in the process of S27, the vehicle identification information of the vehicle 3 for which the power supply termination process has already been performed (S28).

After that, the server 30 sends the vehicle information associated with the vehicle identification information that has not been deleted in the process of S28 out of the vehicle identification information of the vehicle 3 specified to be located in the vicinity area of each supply device 5 to each supply device 5 (S29).

After the vehicle information is transmitted to each supply device 5 in the process of S29, when the supply device 5 receives the vehicle information from the server 30, the supply device 5 registers/deletes the vehicle identification information in the identification information list (S30). The processing of S30 is the same as the processing of S14 in FIG. 7. After that, the supply device 5 transmits the vehicle identification information registered in the identification information list to the server 30 (S31). The processing of S31 is the same as the processing of S15 in FIG. 7.

When the server 30 receives the vehicle identification information from the supply device 5, the server 30 transmits a list registration notification to the vehicle 3 corresponding to the vehicle identification information registered in the identification information list (S32). The processing of S32 is the same as the processing of S16 in FIG. 7.

As a result, when the processing shown in FIG. 8 is performed, the identification information list indicates that each supply device 5 is located in the vicinity area, that the supply device 5 has not finished supplying power, and that the vehicle identification information is registered for the vehicle 3 for which no identification information erasure request has been made. Then, when the vehicle identification information of the vehicle 3 is registered in the identification information list of any supply device 5, the vehicle 3 receives the list registration notification. Therefore, the vehicle ECU 330 can determine that the own vehicle is registered in any of the supply devices 5 by receiving the list registration notification. When the vehicle 3 moves out of the vicinity area of the supply device 5, the vehicle identification information of the vehicle 3 is deleted from the identification information list of the supply device 5.

Return to FIG. 6. In addition, at the Power transfer terminated A170, the power receiving device 20 does not need to do anything to make the transmission power zero. The P2PS interface remains active when the vehicle 3 is in the D-WPT lane and the state of the power receiving device 20 automatically transitions to pairing for the next power transfer from the primary device 13. The state transitions from Power transfer terminated A170 to Pairing and Alignment Check A130 as the transition line shown in FIG. 6. As shown in FIG. 6, when a predetermined transition condition is satisfied, the magnetic coupling check A140 can transition to the pairing and alignment check A130, and the perform power transfer A150 can transition to the pairing and alignment check A130. The pairing may be performed individually for the plurality of primary coils 11 or may be performed at a representative point by bundling the plurality of primary coils 11.

In the D-WPT service session A70, when there is no D-WPT request from the vehicle ECU 330, or a series of states from the communication setting and D-WPT service request A60 to the Power transfer terminated A170 are prohibited. In this case, the process transitions to D-WPT service session end A80, and the wide area wireless communication between the first communication device 120 and the third communication device 340 is stopped. For example, the D-WPT shuts down when the state of charge in battery 320 is too high or when power receiving device 20 is too hot for continuous power transfer. Such unnecessary D-WPT can be disabled by simply deactivating the P2PS interface. However, by stopping the wide area wireless communication, the power transmission ECU 110 can terminate the established wide area wireless communication, thereby freeing up the memory occupied for the vehicle 3 without requiring the D-WPT.

Also, the D-WPT service session A70 is not limited to transitions such as the transition lines shown in FIG. 6. When the D-WPT service session A70 completes the activities after the pairing and alignment check A130, if the conditions are met for the power transfer process to remain in the D-WPT service session A70, the state does not transition to terminate D-WPT service session A80, but transitions to compatibility check and service authentication A110. For example, if a predetermined transition condition is met in state Magnetic Coupling Check A140, the state can transition to Compatibility Check and Service Authentication A110.

Control Device for Power Supply During Traveling

A control device for power supply while running according to an embodiment will be described with reference to the drawings. The control device for power supply during traveling according to the embodiment is specifically realized by the function of the supply device 5 shown in FIG. 2 described above. Further, the control device for power supply during traveling according to the embodiment performs control described below during the D-WPT service session A70 of the power transmission process (D-WPT process) shown in FIG. 6.

The control performed by the control device for power supply during traveling according to the embodiment is mainly performed by the power transmission ECU 110 of the supply device 5. This power transmission ECU 110 is configured to be able to control a foreign object detection device 140 provided in the supply device 5.

As described above, the foreign object detection device 140 is configured to be able to detect a living body (human body, animal, etc.), metallic foreign object, etc. in the vicinity of the power supply lane (for example, above the primary coil 11). Although the foreign object detection device 140 is illustrated in FIG. 2 as one device including a living body protection function (LOP) and a foreign matter detection function (FOD), a living body detector that exerts the living body protection function and a foreign matter detection function. A foreign object detector that exhibits the above may be configured separately.

The power transmission ECU 110 determines the type of the power transmitting device 10 that transmits power to the running vehicle 3, the type of the power receiving device 20 provided in the vehicle 3, the detection range of the foreign object detection device 140 provided in the power transmitting device 10, Based on the positional relationship between the power transmitting device 10 and the power receiving device 20, an upper limit of power to be transmitted from the power transmitting device 10 to the power receiving device 20 is determined.

"Type of power transmitting device 10" specifically indicates the type (kind) of primary coil 11. Examples of the type of primary coil 11 include those shown in FIGS. 9A, 9B, and 9C. "Supply power circuit" in the figure indicates a circuit group (PFC circuit 210, inverter 220, filter circuit 230, power transmission side resonance circuit 240) included in the power transmitting device 10 of FIG. 2.

Figure 9A:
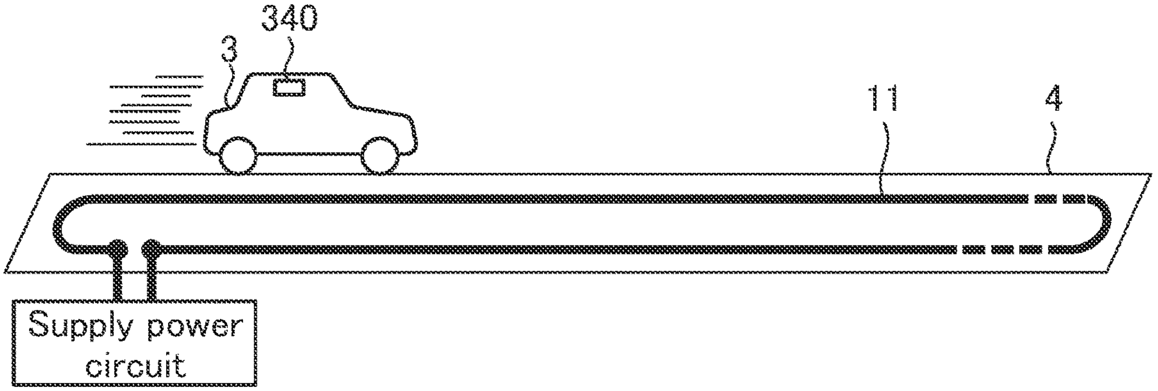
FIG. 9A is a schematic diagram for explaining an example of the type of primary coil of a power transmitting device in a wireless power transmission system.
Figure 9B:
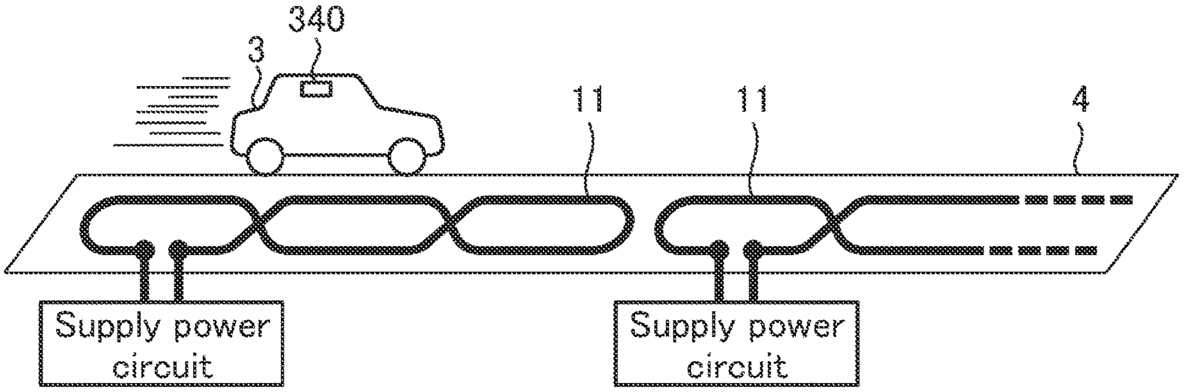
FIG. 9B is a schematic diagram for explaining an example of the type of primary coil of a power transmitting device in a wireless power transmission system.

FIG. 9A shows a case where one primary coil 11 is provided on the road 4, and one "Supply power circuit" is provided for one primary coil 11. Further, FIG. 9B shows a case where a plurality of primary coils 11 are provided on the road 4, and one "Supply power circuit" is provided for the plurality of primary coils 11. Furthermore, FIG. 9C shows a case where a plurality of primary coils 11 are provided on the road 4, and one "Supply power circuit" is provided for one primary coil 11.

Figure 9C:
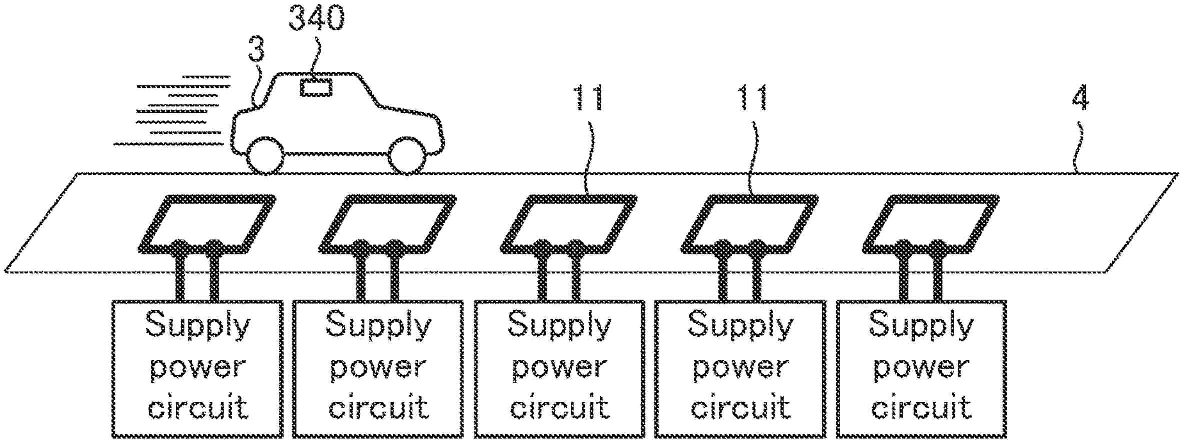
FIG. 9C is a schematic diagram for explaining an example of the type of the primary coil of the power transmitting device in the wireless power transmission system.

As shown in FIG. 9C, the larger the number of primary coils 11 installed on the road 4 and the number of corresponding "Supply power circuits", the larger the magnetic field generated during power transmission, and the larger the leakage magnetic field.

Become. That is, the magnitude of the leakage magnetic field during power transmission increases in the order of FIG. 9A, FIG. 9B, and FIG. 9C.

"Type of power receiving device 20" specifically indicates the type (kind) of secondary coil 21. Examples of the type of secondary coil 21 include those shown in FIGS. 10A, 10B, and 10C.

Figure 10A:
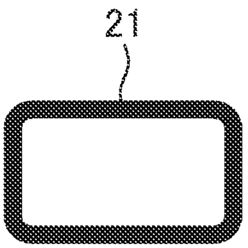
FIG. 10A is a schematic diagram for explaining an example of the type of secondary coil of a power receiving device in a wireless power transmission system.
Figure 10B:
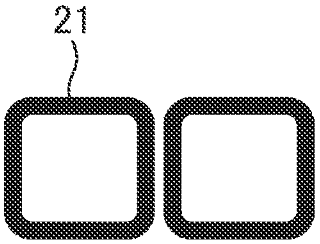
FIG. 10B is a schematic diagram for explaining an example of the type of secondary coil of the power receiving device in the wireless power transmission system.

FIG. 10A shows a case where only one secondary coil 21 is provided. Moreover, FIG. 10B shows a case where the secondary coil 21 is composed of two. Moreover, FIG. 10C shows a case where the secondary coil 21 is composed of three.

Figure 10C:
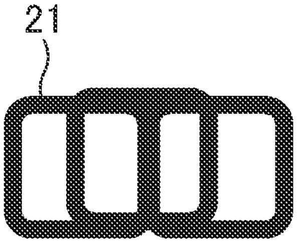
FIG. 10C is a schematic diagram for explaining an example of the type of secondary coil of the power receiving device in the wireless power transmission system.

As shown in FIG. 10C, the larger the number of secondary coils 21 installed in the vehicle 3, the larger the magnetic field generated during power transmission, and the larger the leakage magnetic field. That is, the magnitude of the leakage magnetic field during power transmission increases in the order of FIG. 10A, FIG. 10B, and FIG. 10C.

The "detection range of the foreign object detection device 140" indicates, for example, a distance at which a living body or a metal foreign object can be detected by the foreign object detection device 140. The larger the detection range of this foreign object detection device 140, the larger the magnetic field generated during power transmission, and the larger the leakage magnetic field.

"The positional relationship between the power transmitting device 10 and the power receiving device 20" specifically refers to the distance between the primary coil 11 and the secondary coil 21. The larger the distance between the primary coil 11 and the secondary coil 21, the larger the leakage magnetic field becomes. For example, when power is transmitted to a passenger car with a low vehicle height, the distance between the secondary coil 21 provided in the passenger car and the primary coil 11 provided on the road 4 is small, so the leakage magnetic field is also small. On the other hand, when power is transmitted to a truck with a high vehicle height, the distance between the secondary coil 21 installed in the truck and the primary coil 11 installed on the road 4 is large, so the leakage magnetic field also increases.

Specifically, power transmission ECU 110 determines the shape of the generated magnetic field from the types of primary coil 11 and secondary coil 21 and the positional relationship between primary coil 11 and secondary coil 21. Then, the power transmission ECU 110 transmits the generated magnetic field to the vehicle 3 based on the shape of the generated magnetic field and the detection range of the living body detection of the foreign object detection device 140 so that the magnetic field outside the detection range of the living body detection does not exceed the permissible value. Determine the upper limit of the power to be used. Thereby, power can be transmitted to the vehicle 3 while observing the permissible value of the magnetic field outside the detection range of living body detection.

Furthermore, power transmission ECU 110 determines the shape of the generated magnetic field from the types of primary coil 11 and secondary coil 21 and the positional relationship between primary coil 11 and secondary coil 21. Then, the power transmission ECU 110 controls the vehicle 3 based on the shape of the generated magnetic field and the detection range of the metal foreign object detection of the foreign object detection device 140 so that the magnetic field outside the detection range of the metal foreign object detection does not exceed a permissible value. Determine the upper limit of the power transmitted to the Thereby, electric power can be transmitted to the vehicle 3 while the magnetic field outside the detection range of metal foreign object detection adheres to the permissible value.

Further, the power transmission ECU 110 may switch the upper limit of power to the vehicle 3 depending on the time of day or the installation location of the primary coil 11 of the power transmitting device 10. In this case, for example, in the early morning and night hours when there are few people passing by, there is no problem even if the leakage magnetic field during power transmission is somewhat large, so it is conceivable to set the upper limit of power to be larger than during the daytime. For example, if the primary coil 11 is installed on an expressway where there is no adjacent sidewalk, there is no problem even if the leakage magnetic field during power transmission is somewhat large. It is conceivable to make the upper limit of the power larger than when the primary coil 11 is installed in a sidewalk. In this way, by making the upper limit of power variable depending on the time of day or the installation location of the primary coil 11 of the power transmitting device 10, it is possible to comply with the permissible value of the leakage magnetic field depending on the time of day or location.

Figure 11:
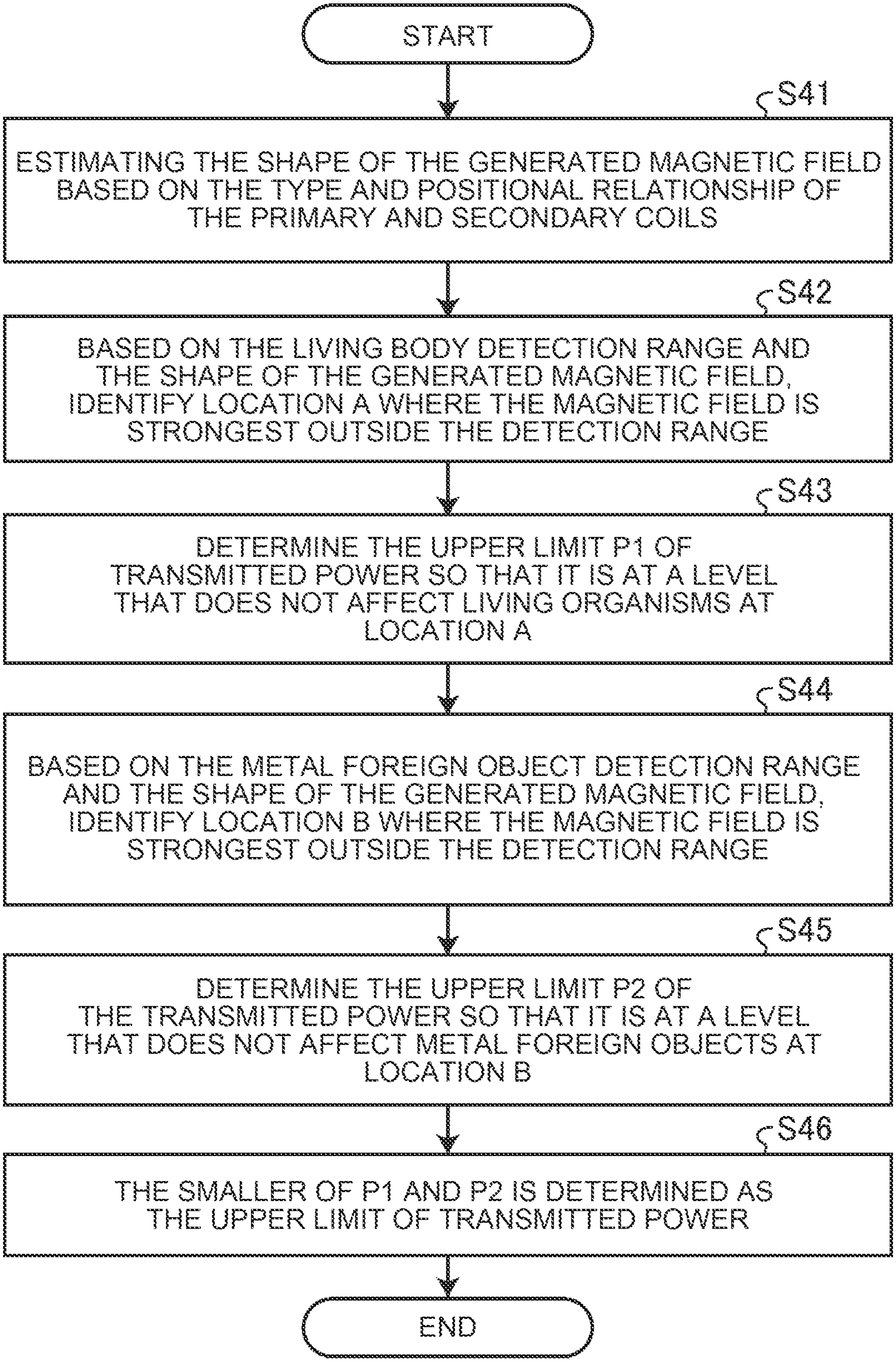
FIG. 11 is a flowchart showing the flow of processing executed by the control device for power supply during traveling according to the embodiment.

Control executed by the control device for power supply during traveling according to the embodiment will be described with reference to FIG. 11. The control shown in the figure is mainly executed by the power transmission ECU 110.

First, the power transmission ECU 110 estimates the shape of the generated magnetic field based on the type and positional relationship of the primary coil 11 and the secondary coil 21 (S41). Next, the power transmission ECU 110 identifies a location A where the magnetic field is largest outside the detection range of living body detection, based on the range of living body detection and the shape of the generated magnetic field estimated in S41 (S42). In S42, the living body detection range and the shape of the generated magnetic field are compared to identify an area where the generated magnetic field extends beyond the living body detection range and where the magnetic field is the largest.

Subsequently, the power transmission ECU 110 determines the upper limit value P1 of the power to be transmitted so as to be at a level that does not affect living organisms at the location A (S43). Next, the power transmission ECU 110 identifies a location B where the magnetic field is largest outside the metal foreign object detection range based on the metal foreign object detection range and the shape of the generated magnetic field estimated in S41 (S44). In S44, the range of metal foreign object detection is compared with the shape of the generated magnetic field, and an area where the generated magnetic field protrudes from the range of metal foreign object detection and where the magnetic field is largest is identified.

Subsequently, the power transmission ECU 110 determines the upper limit value P2 of the power to be transmitted so as to be at a level that does not affect metal foreign objects at location B (S45). Note that "there is no effect on the metallic foreign matter" indicates that the metallic foreign matter is not overheated to a temperature higher than a preset temperature (for example, 80° C., etc.). Subsequently, the power transmission ECU 110 determines the smaller of the upper limit values P1 and P2 as the upper limit value of the transmitted power (S46), and completes this process.

According to the control device for power supply during traveling according to the embodiment described above, power can be transmitted to the vehicle 3 while satisfying the allowable value of the leakage magnetic field.

Further advantages and modifications can be easily derived by those skilled in the art. Therefore, the broader aspects of the disclosure are not limited to the specific details and representative embodiments shown and described above. Accordingly, various changes may be made without departing from the spirit or scope of the general inventive concept defined by the appended claims and equivalents thereof.

What is claimed is:

1. A control device for power supply during traveling, the control device comprising a processor, wherein the processor determines, based on a category of a power transmitting device that transmits power to a vehicle that is traveling, a category of a power receiving device provided in the vehicle, a detection range of a foreign object detection unit provided in the power transmitting device, and a positional relationship between the power transmitting device and the power receiving device, an upper limit of power to be transmitted from the power transmitting device to the power receiving device.

2. The control device according to claim 1, wherein the processor determines, based on the category of each of the power transmitting device and the power receiving device, a shape of a generated magnetic field obtained from the positional relationship between the power transmitting device and the power receiving device, and a detection range of living body detection of the foreign object detection unit, the upper limit of the power such that a magnetic field outside the detection range of the living body detection does not exceed an allowable value.

3. The control device according to claim 1, wherein the processor determines, based on the category of each of the power transmitting device and the power receiving device, a shape of a generated magnetic field obtained from the positional relationship between the power transmitting device and the power receiving device, and a detection range of metal foreign object detection of the foreign object detection unit, the upper limit of the power such that a magnetic field outside the detection range of the metal foreign object detection does not exceed an allowable value.

4. The control device according to claim 1, wherein the processor switches the upper limit of the power depending on a time zone or an installation location of the power transmitting device.

* * * * *